US011436314B2

(12) United States Patent
Alzahrani et al.

(10) Patent No.: US 11,436,314 B2
(45) Date of Patent: Sep. 6, 2022

(54) SYSTEM AND METHOD FOR PROVISIONING NON-ENTERPRISE CLIENT DEVICES WITH ACCESS CREDENTIALS

(71) Applicant: Saudi Arabian Oil Company, Dhahran (SA)

(72) Inventors: Abdullah Alzahrani, Dhahran (SA); Ibrahim Alomari, Dhahran (SA); Jewahir Abubeker, Dhahran (SA); Hassan Ayoub, Dhahran (SA); Meshal Alhazmi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 34 days.

(21) Appl. No.: 16/274,999

(22) Filed: Feb. 13, 2019

(65) Prior Publication Data
US 2020/0257793 A1 Aug. 13, 2020

(51) Int. Cl.
*G06F 21/45* (2013.01)
*H04L 51/04* (2022.01)
*H04L 61/4523* (2022.01)

(52) U.S. Cl.
CPC .............. *G06F 21/45* (2013.01); *H04L 51/04* (2013.01); *H04L 61/4523* (2022.05)

(58) Field of Classification Search
CPC ..... G06F 21/45; H04L 51/04; H04L 61/1523; H04L 63/0209; H04L 63/083; H04L 63/18; H04L 63/02
See application file for complete search history.

(56) References Cited

U.S. PATENT DOCUMENTS 7,496,760 B2 2/2009 Banks-Binici et al.
9,356,841 B1 5/2016 Balazs et al.
(Continued)

FOREIGN PATENT DOCUMENTS

WO WO-2019021048 A1 * 1/2019 ............ H04L 67/02

OTHER PUBLICATIONS

Microsoft Azure, "Automate user provisioning and deprovisioning to SaaS applications with Azure Active Directory," dated Feb. 12, 2019, Retrieved from: <https://docs.microsoft.com/en-us/azure/active-directory/active-directory-saas-app-provisioning>.
(Continued)

*Primary Examiner* — Harunur Rashid
(74) *Attorney, Agent, or Firm* — Leason Ellis LLP

(57) ABSTRACT

A system, a method, or a computer program for provisioning a non-enterprise client device with access to an extranet enterprise domain. The system includes an enterprise client device connected to an intranet, a provisioner that receives an extranet registration request from the enterprise client device, an active directory connected to the intranet, a database that stores a non-enterprise client record populated with the non-enterprise client data, a primary transmission system connected to the intranet that transmits a portion of the non-enterprise client data and a linkage message outside of the intranet, and a secondary transmission system connected to the intranet and configured to transmit to an access message outside of the intranet, wherein the provisioner generates a unique permanent identification $ID_{INDEX}$ for the non-enterprise client record.

18 Claims, 8 Drawing Sheets

(56) References Cited

U.S. PATENT DOCUMENTS

| | | | |
|---|---|---|---|
| 9,450,944 B1* | 9/2016 | Sousley | H04L 67/02 |
| 9,680,813 B2 | 6/2017 | Sade et al. | |
| 9,838,376 B1 | 12/2017 | Lander et al. | |
| 2004/0148517 A1 | 7/2004 | Banks-Binici et al. | |
| 2006/0123234 A1* | 6/2006 | Schmidt | H04L 63/168 |
| | | | 713/168 |
| 2007/0220154 A1* | 9/2007 | El Husseini | H04L 63/0281 |
| | | | 709/227 |
| 2013/0091171 A1 | 4/2013 | Lee | |
| 2013/0227667 A1* | 8/2013 | Lundblade | G06F 21/33 |
| | | | 726/7 |
| 2019/0372960 A1* | 12/2019 | Huang | H04W 12/06 |

OTHER PUBLICATIONS

Microsoft Azure, "Azure AD Connect user sign-in options," dated Feb. 12, 2019, Retrieved from: <https://docs.microsoft.com/en-us/azure/active-directory/hybrid/plan-connect-user-signin>.

Okta, Inc., Lifecycle Management, URL: <https://www.okta.com/products/lifecycle-management/>.

International Search Report and Written Opinion in Corresponding Patent Application No. PCT/US2020/017038 dated Aug. 4, 2020. 12 pages.

International Search Report in Corresponding Patent Application No. PCT/US2020/017038 dated Apr. 20, 2020. 10 pages.

Examination Report in Corresponding Patent Application No. GC 2020-39166 dated Jul. 10, 2021 (4 pages).

\* cited by examiner

ENTERPRISE CLIENT

NON-ENTERPRISE EMAIL: [ ]   MOBILE NO.: [ ]

[REGISTER]

---

NON-ENTERPRISE CLIENT(S) AUTHORIZED TO INVITE:

1) JOHN DOE
NON-ENTERPRISE EMAIL: [ ]   MOBILE NO.: [ ]
[INVITE]

2) JANE DOE (<u>INACTIVE</u>)
NON-ENTERPRISE EMAIL: [JaneDoe@m.com]   MOBILE NO.: [+9665618xxxxx]
[RESEND ACTIVATION] [EDIT] [DELETE]

3) JOHN SMITH (<u>ACTIVE</u>)
NON-ENTERPRISE EMAIL: [JohnSmith@l.com]   MOBILE NO.: [+9665617xxxxx]
[RESET LOGIN DETAIL] [EDIT] [DELETE]

FIG. 8

SYSTEM AND METHOD FOR PROVISIONING NON-ENTERPRISE CLIENT DEVICES WITH ACCESS CREDENTIALS

FIELD OF THE DISCLOSURE

The present disclosure relates to a system, a method, and a computer program for provisioning non-enterprise client devices with credentials to securely access a network website.

BACKGROUND OF THE DISCLOSURE

Non-public enterprise network systems are continuously under attack. The attacks are not always direct, but frequently involve attacks made possible through non-enterprise client devices. These non-enterprise client devices may not have any awareness that they are serving as vehicles in attempts by unscrupulous individuals to breach network security and access proprietary information on the enterprise network systems, or in some way adversely impact or affect the enterprise network system. Numerous retailer enterprise network systems have recently been breached through non-enterprise client devices, such as, for example, vendor point-of-sale (PoS) communicating devices that had access to the enterprise network systems.

There exists a need for a technology solution that restricts access to an enterprise network system while providing non-enterprise client devices with access to network resources. The disclosure provides a technology solution that meets the foregoing need.

SUMMARY OF THE DISCLOSURE

The disclosure provides a novel technology solution, including a method, a system, and a computer program for provisioning non-enterprise client devices to access an extranet enterprise domain.

According to an aspect of the disclosure, a system is provided that provisions a non-enterprise client device with access to an extranet enterprise domain. The system comprises: an enterprise client device connected to an intranet; a provisioner that receives an extranet registration request from the enterprise client device and parses enterprise client data and non-enterprise client data from the extranet registration request; an active directory connected to the intranet and having an enterprise client record associated with the enterprise client data; a database that stores a non-enterprise client record populated with the non-enterprise client data; a primary transmission system connected to the intranet that transmits a portion of the non-enterprise client data and a linkage message outside of the intranet; and a secondary transmission system connected to the intranet and configured to transmit to an access message outside of the intranet, wherein the provisioner generates a unique permanent identification $ID_{INDEX}$ for the non-enterprise client record. The provisioning system can further comprise a registration application programming interface that receives the linkage message from the provisioner and generates an email message, including an activation link.

The portion of the non-enterprise client data can comprise a non-enterprise email address and an automatic number identification for a non-enterprise client device.

The provisioner can generate the linkage message and the access message.

The provisioner can perform an outbound call through the intranet firewall to the registration application programming interface. The outbound call can comprise a representational state transfer (REST) application programming interface call.

The linkage message can be sent to a non-enterprise client device in an email message.

The access message can be sent in an SMS text message to the non-enterprise client device.

The active directory can comprise a lightweight directory access protocol (LDAP) directory. The provisioner can query the active directory in response to the extranet registration request to locate the enterprise client record.

The registration application programming interface can receive the non-enterprise client identifier $ID_{INDEX}$ for the non-enterprise client. The registration application programming interface can receive the portion of the non-enterprise client data.

According to a further aspect of the disclosure, a method is provided for provisioning a non-enterprise client device with access to an extranet enterprise domain. The method comprises: receiving an extranet registration request from an enterprise client device connected to an intranet; parsing enterprise client data and non-enterprise client data from the extranet registration request; querying an active directory for an enterprise client record based on the enterprise client data, the active directory being connected to the intranet; storing the non-enterprise client data in a non-enterprise client record; generating a unique permanent identification $ID_{INDEX}$ for the non-enterprise client record; transmitting by a primary transmission system a portion of the non-enterprise client data outside of the intranet; and transmitting by a secondary transmission system an access message outside of the intranet, the secondary transmission system being different than the primary transmission system.

The method can comprise: generating a linkage message based on the non-enterprise client data; and transmitting the linkage message outside of the intranet.

The method can comprise transmitting the access message to a non-enterprise client device, wherein the access message can comprise an SMS text message.

The method can comprise receiving the portion of the non-enterprise client data at a registration application programming interface and/or receiving the linkage message at a registration application programming interface.

The method can comprise: generating an electronic mail message by the registration application programming interface; and sending the electronic mail message to the non-enterprise client device, wherein the electronic mail message can include an activation link.

The transmitting the linkage message can comprise sending an electronic mail message to a non-enterprise client device.

According to a further aspect of the disclosure, a non-transitory computer readable storage medium storing non-enterprise client device provisioning instructions for causing a non-enterprise client device to be provisioned to access an extranet enterprise domain. is provided that includes a computer program, which when executed by one or more computing devices, the provisioning instructions comprising the steps of: receiving an extranet registration request from an enterprise client device connected to an intranet; parsing enterprise client data and non-enterprise client data from the extranet registration request; querying an active directory for an enterprise client record based on the enterprise client data, the active directory being connected to the intranet; storing the non-enterprise client data in a non-enterprise client record; generating a unique permanent identification IDINDEX for the non-enterprise client record; transmitting by a primary transmission system a portion of the non-enterprise client data outside of the intranet; and transmitting by a secondary transmission system an access message outside of the intranet, the secondary transmission system being different than the primary transmission system. The provisioning instructions can comprise the steps of: generating a linkage message based on the non-enterprise client data; or transmitting the linkage message outside of the intranet; or transmitting the access message to a non-enterprise client device, wherein the access message can comprise an SMS text message; or receiving the portion of the non-enterprise client data at a registration application programming interface; or receiving the linkage message at a registration application programming interface; or generating an electronic mail message by the registration application programming interface; or sending the electronic mail message to the non-enterprise client device, wherein the electronic mail message can include an activation link.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 8 shows an example a display screen that can be generated and displayed as a GUI on a display of an enterprise client device in the enterprise network system in FIG. 1.

Figure 1:
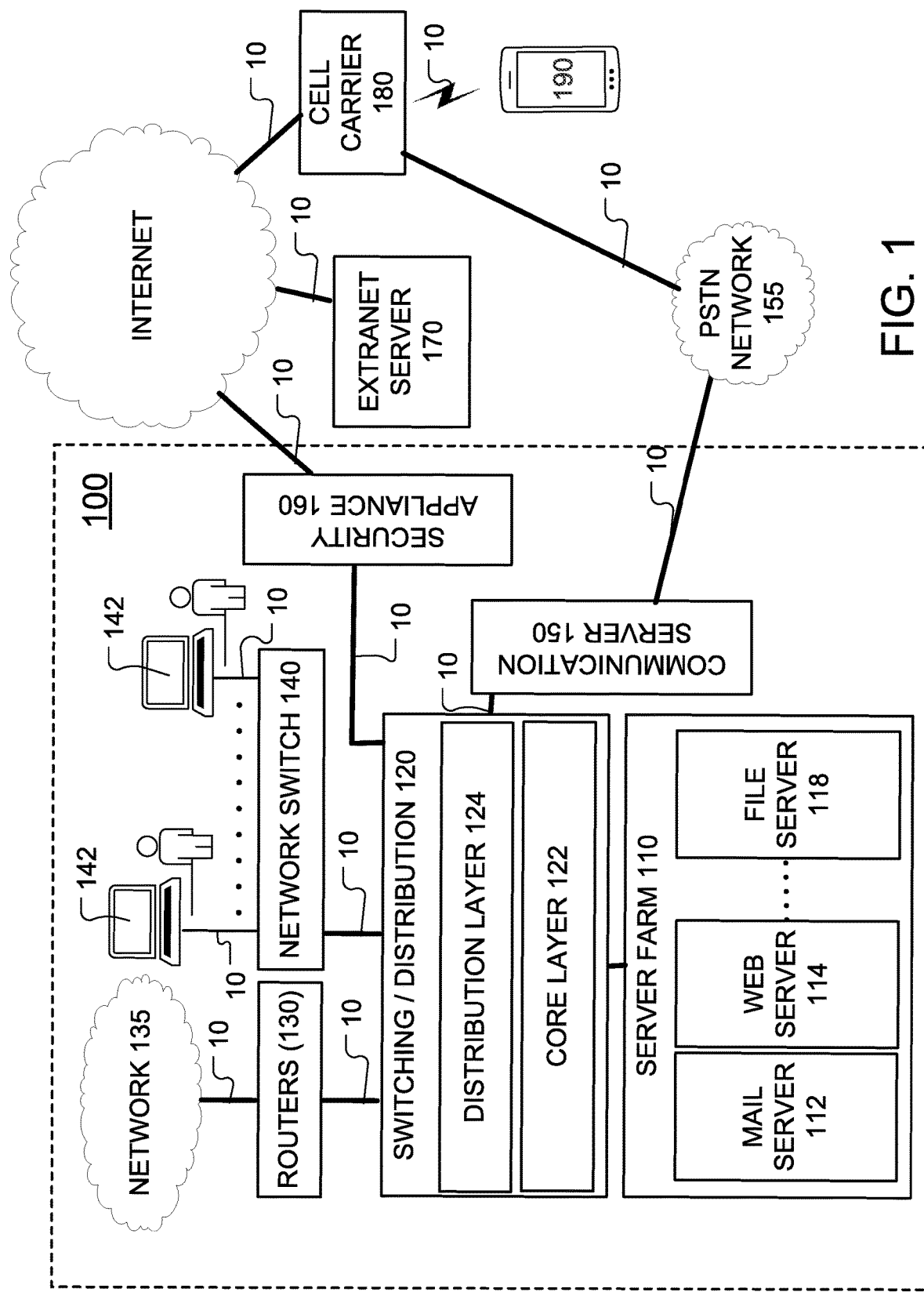
FIG. 1 shows a block diagram of an example of an enterprise network system that is constructed according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those skilled in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows a non-limiting embodiment of an enterprise network system 100 that is constructed according to the principles of the disclosure. The enterprise network system 100 can include a server farm 110, switching and distribution layers 120, one or more routers 130, one or more network switches 140, a communication server 150, and a security appliance 160, all of which can be interconnected by communication links 10 and located behind a firewall. The enterprise network system 100 can include one or more modems (not shown) configured for one or more cellular network standards, including, for example, GSM, WiMAX, LTE-TDD/TD-LTE, LTE Advanced (E-UTRA), LTE Advanced Pro, HiperMAN, Mobile WiMAX, Flash-OFDM, iBurst, CDMA2000, HSPA, UMTS, WiDEN, GPRS, CDPD, D-AMPS, NMT, AMPS, or the like, or any other modulating/demodulating device that can facilitate transmission of short message services (SMS) messages, or the like, over the public switched telephone network (PSTN), the public land mobile network (PLMN), or the like. The enterprise network system can include an SMS gateway (not shown).

The enterprise network system 100 can be configured such that enterprise client identity information is not stored nor made available in any way outside of the intranet, thereby providing enhanced network security that minimizes potential breaches to the system.

The server farm 110 can include a plurality of servers, including a mail server 112, a web server 114, and a file server 118. The communication server 150, which is preferably located on the intranet, can be located in the server farm 110. The intranet can include all of the foregoing and a firewall to protect against threats and breach attempts made against the enterprise network system 100.

The security appliance 160 can include hardware, firmware, or software that provides malware protection, application visibility and control, reporting, secure mobility, and protection against threats that can arise during connection to non-enterprise devices (such as, e.g., computing devices that are external to the intranet) or the Internet. The security appliance 160 includes a firewall. The security appliance 160 can include a primary transmission system. The primary transmission system can include, for example, Internet message handling services (MHS) that transfer electronic mail messages between communicating devices on the intranet with communicating devices external to the intranet. The MHS can include, for example, a message transfer agent or mail transfer agent (MTA), a mail relay, or the like. The primary transmission system can include a message delivery agent (MDA).

The switching and distribution layers 120 can include a core layer 112 and a distribution layer 124. The core layer 112 can include one or more layers of switching devices (not shown) that connect the server farm 110 to the distribution layer 124. The distribution layer 124 can include one or more layers of switching devices (not shown) that connect the core layer 122 to the one or more routers 130, the one or more network switches 140, the communication server 150, or the security appliance 160. The switching and distribution layers 120 can include one or more routers (not shown).

The router(s) 130 can be connected to a network 135 by a communication link 10. The router(s) 130 can include a firewall (not shown). The network switch(es) 140 can be connected to one or more enterprise client devices 142 by one or more associated communication links 10. The network switch(es) 140 can include ethernet switches. Data packets can be securely transported between devices on the intranet.

The communication server 150 can include a standards-based computing system that can operate as a carrier-grade common platform for a wide range of communications applications and facilitate communication over, for example, the PSTN 155 or the PLMN (not shown). The communication server 150 can include or be connected to an SMS gateway (not shown) that can be connected to one or more modems to transmit SMS messages over the PSTN 155 or the PLMN (not shown). The communication server 150 can include a secondary transmission system. The secondary transmission system can include, for example, an SMS gateway that facilitate SMS traffic between the enterprise network system 100 and communicating devices such as the non-enterprise client device 190.

Internet message handling services (MHS) that transfer electronic mail messages between communicating devices on the intranet with communicating devices external to the intranet. The MHS can include, for example, a message transfer agent or mail transfer agent (MTA), a mail relay, or the like. The primary transmission system can include a message delivery agent (MDA).

The enterprise network system 100 can be connected to the Internet over a communication link 10. The enterprise network system 100 can be connected to an extranet server 170 directly over the communication link 10 or via the Internet over one or more communication links 10. The extranet server 170 can host an extranet enterprise domain on the Internet or a non-enterprise network. The extranet enterprise domain can include one or more extranet websites. The extranet enterprise domain can include host applications such as, for example, applications provided by a human resources department that are intended for access by employees and family members of employees who are enterprise clients. The hosted applications can be accessible on or through one or more extranet websites. A non-enterprise client device 190 can be configured to access the Internet over a communication link 10 via, for example, a cellular carrier 180 or Internet service provider (ISP) (not shown). The non-enterprise client device 190 can be provisioned to access the extranet enterprise domain, including, for example, one or more of the extranet websites.

Figure 2:
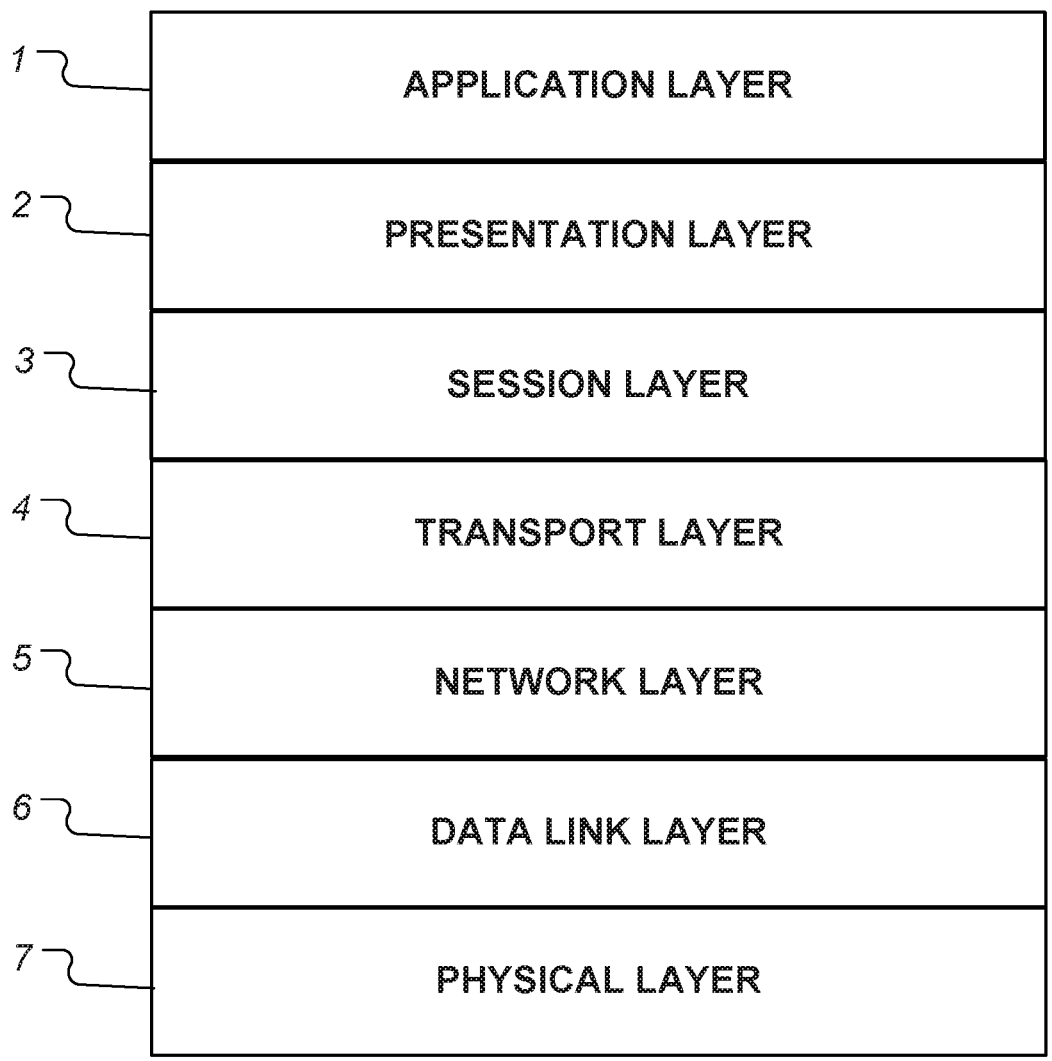
FIG. 2 depicts the Open Systems Interconnection (OSI) model.

FIG. 2 shows the seven-layer OSI model. The enterprise network system 100, including the computing devices that are connected to the enterprise network system 100, can operate at any one or more of the seven layers in the OSI model at any instant in time, including the application layer 1, presentation layer 2, session layer 3, transport layer 4, network layer 5, link layer 6, and physical layer 7. The enterprise client devices 142 and non-enterprise client device(s) 190 can operate at any one or more of the seven layers in the OSI model. Each of the enterprise client devices 142 and non-enterprise client device(s) 190 includes a computing device.

Referring to FIG. 2, the application layer 1 is the OSI layer in a computing device that is closest to the end user. The application layer 1 interacts with software applications in the computing device that implement a communicating component. The application layer 1 can include, for example, a search engine or any other software application which the end user can interact with to carry out a functionality.

The presentation layer 2 establishes context between software applications, which might use different syntax and semantics. The presentation layer 2 transforms data into a form that each software application can accept. An operating system is an example of the presentation layer 2.

The session layer 3 controls the connections between computing devices in a communication system. This layer is responsible for establishing, managing and terminating connections between local and remote applications. The layer can provide for full-duplex, half-duplex, or simplex operations, and is responsible for establishing checkpointing, adjournment, termination, and restart procedures.

The transport layer 4 provides the functional and procedural mechanisms for transferring variable-length data sequences from a source computing device to a destination computing device, while maintaining quality-of-service (QoS). The transport layer 4 controls the reliability of a given link through flow control, segmentation and desegmentation, and error control. The transport layer 4 can include, for example, tunneling protocols, the Transmission Control Protocol (TCP) and the User Datagram Protocol (UDP).

The network layer 5 provides the functional and procedural mechanisms for transferring data packets from a node on a network to another node on a different network. If the data to be transmitted is too large, the network layer 5 can facilitate splitting the data into a plurality of segments at the node and sending the fragments independently to the other node, where the segments can be reassembled to recreate the transmitted data. The network layer 5 can include one or more layer-management protocols such as, for example, routing protocols, multicast group management, network layer information and error, and network layer address assignment.

The link layer 6 is responsible for node-to-node transfer between computing devices in a communication system. In IEEE 802 implementations, the link layer 6 is divided into two sublayers, consisting of a medium access control (MAC) layer and a logical link control (LLC) layer. The MAC layer is responsible for controlling how devices in a network gain access to a medium and permission to transmit data. The LLC layer is responsible for identifying and encapsulating network layer protocols, and for controlling error checking and frame synchronization.

The physical layer 7 includes the hardware that connects the computing systems. The hardware can include for example connectors, cables, switches, and the like, that provide for transmission and reception of instruction and data streams between the computing devices.

Figure 3:
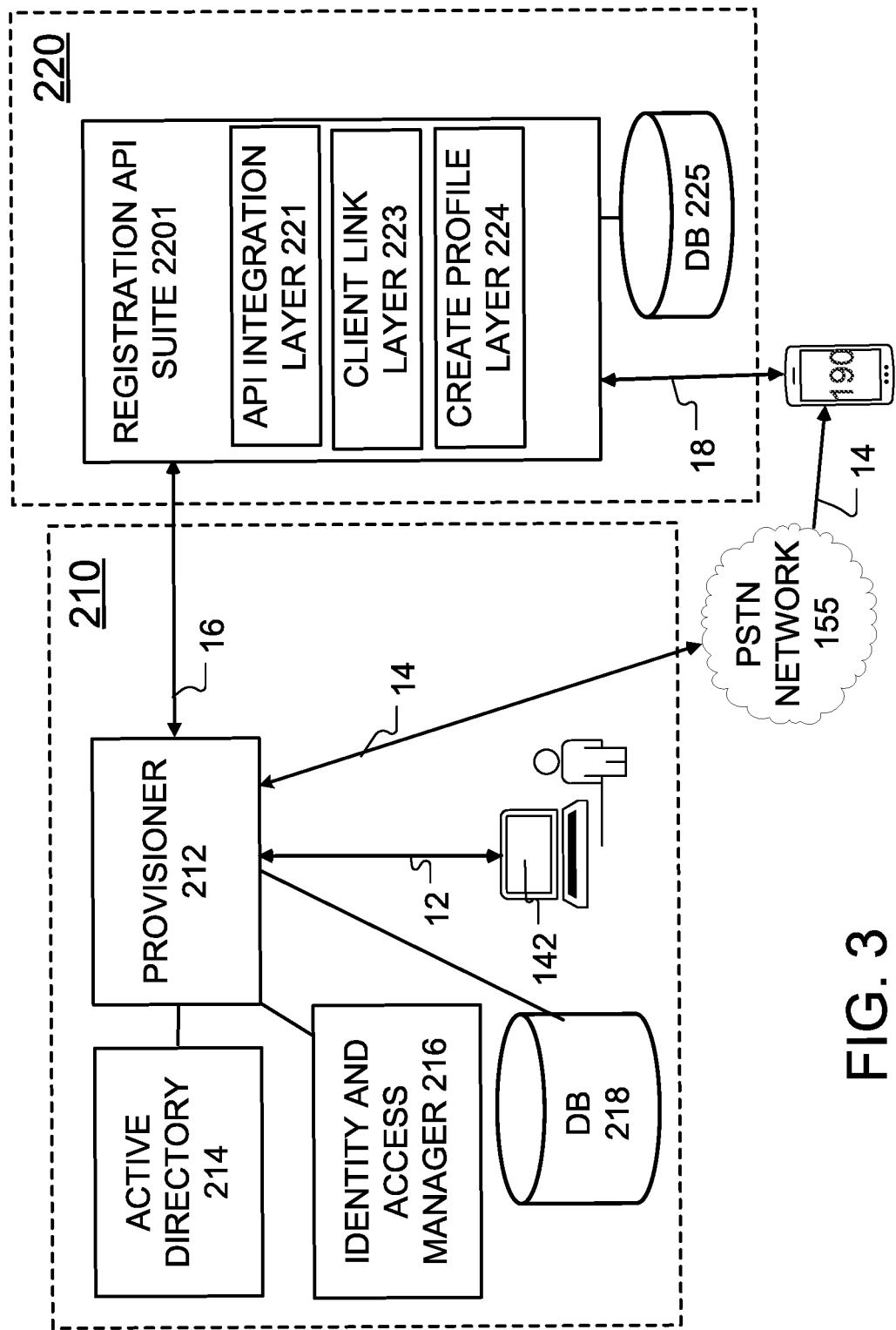
FIG. 3 shows a block diagram of an example of a provisioning system for provisioning non-enterprise clients, which is constructed according to the principles of the disclosure.

FIG. 3 shows a block diagram of an example of a provisioning system for provisioning client devices that is constructed according to the principles of the disclosure. The provisioning system comprises an intranet provisioning system 210 and an extranet provisioning system 220. The intranet provisioning system 210 is located behind a firewall (not shown) in the intranet, in the enterprise network system 100 (shown in FIG. 1). The extranet provisioning system 220 can be located, for example, in the extranet server 170 or on the Internet, such as, for example, a cloud environment, or on a non-enterprise network.

The intranet provisioning system 210 includes a provisioner 212. The intranet provisioning system 210 can include an active directory 214, an identity and access management (IAM) system 216, and a database 218. The active directory 214 can be located in the database 218 or elsewhere in the intranet. The database 218 can include a relational database. The database 218 can include a database index. The provisioner 212 can be communicatively connected to the extranet provisioning system 220, the PSTN (or PLMN) 155, and one or more enterprise client devices 142 over communication links 16, 14, and 12, respectively.

The provisioner 212 can include an intermediary registration provisioning layer (not shown) that receives a non-enterprise client provisioning request over the communication link 12 from the enterprise client device 142 (e.g., at the instruction of an enterprise client). The enterprise client device 142 is located in the intranet, behind the firewall in the enterprise network system 100. The extranet provisioning request can include a request that the non-enterprise client device 190 be provisioned to access the extranet enterprise domain (e.g., website) or to send an invitation to another non-enterprise client device (not shown) to register for provisioning to access the extranet enterprise domain. The enterprise client device 142 can be provided with, for example, a graphic user interface (GUI) through which an enterprise client can request that the non-enterprise client device 190 be provisioned with access to the extranet enterprise domain.

The IAM system 216 can manage and control all enterprise client accounts in the intranet in the enterprise network system 100. The JAM system 216 can manage and control all rights, privileges, and policies for each enterprise client in the enterprise network system 100, including rights, privileges and policies relating to the enterprise clients' access to resources in the enterprise network system 100. The JAM system 216 can store the assigned rights, privileges, and policies in an enterprise user profile for each enterprise client, with a unique enterprise client profile being created and managed for each enterprise client in the enterprise network system 100. The IAM system 216 can provide automated enterprise client profile synchronization for all enterprise clients to ensure that enterprise clients have access to only those resources they are intended to have access. For instance, an enterprise client whose role is that of a network administrator may be granted significantly greater and broader access rights and privileges than an enterprise client whose role is that of, for example, a file clerk.

A unique permanent identification $ID_{INDEX}$ can be generated for each registered non-enterprise client by the provisioner 212 and then synched to the external non-enterprise client directory hosted in the Internet or non-enterprise network. The $ID_{INDEX}$ can act as a mapper or a link for each created non-enterprise client account in the Internet directory with a valid enterprise client existing in the intranet. After the $ID_{INDEX}$ is created for a non-enterprise client, a linkage message can be created by the provisioner 212 and sent to the non-enterprise client device 190 over the primary transmission system, such as, for example, an email that is sent via the security appliance 160 (shown in FIG. 1) and the Internet to the non-enterprise client device 190. A plurality of linkage messages can be generated for a given enterprise client and sent to associated non-enterprise client devices (not shown). The linkage message can include a registration link that, when selected at the non-enterprise client device 190, can instruct the device to initiate communication with and connect the non-enterprise client device 190 to the extranet provisioning system 220. The initiation and connection can be accomplished through, for example, a web browser on the non-enterprise client device 190. For instance, a non-enterprise client can select the registration link (e.g., by double-clicking on a hyperlink) in an email received from the provisioner 212 and opened on the non-enterprise client device 190, which can instruct the device to launch a web browser and link to a web page hosted by the extranet provisioning system 220.

After the $ID_{INDEX}$ is created for the non-enterprise client, an access message can be created by the provisioner 212 and sent to the associated non-enterprise client device 190 via a secondary transmission system, such as, for example, the communication link 14 and PSTN 155 (or PLMN, not shown). If multiple linkage messages are created for non-enterprise clients, then an associated number of access messages can be created by the provisioner 212. The access message can include an initial password that is associated with the $ID_{INDEX}$ and sent in, for example, an SMS message to the non-enterprise client device 190. The initial password can include a plurality of alphanumeric characters, a plurality of symbols, a hexadecimal value, or the like. The access message can be sent to the non-enterprise client device 190 concurrently with the linkage message, or at a different time. After the access message is received by the non-enterprise client device 190 and the device has established communication with the extranet provisioning system 212 via the linkage message, a user can interact with the non-enterprise client device 190 to create a non-enterprise client account on, for example, the extranet server 170 (shown in FIG. 1) to access the extranet enterprise domain on the extranet server 170 or the Internet. The non-enterprise client account can include the $ID_{INDEX}$ assigned to the particular non-enterprise client.

The provisioner 212 can generate a plurality of linkage message and access message pairings to create a group of non-enterprise client accounts, each having a unique $ID_{INDEX}$ and provision each non-enterprise client account in the group with access to the extranet enterprise domain. Each non-enterprise client account can include a non-enterprise client profile that includes predetermined rights, privileges, and policies, so that a particular non-enterprise client can only access portions of the extranet enterprise domain (e.g., applications) permitted under the associated non-enterprise client account. As a result, enterprise clients and non-enterprise clients can be authenticated and authorized to access applications hosted in the extranet enterprise domain, without using or storing any enterprise information outside of the intranet, such as, for example, corporate user related identity details, such as email address, network identification, phone number, automatic number identification (ANI), or the like.

The extranet provisioning system 220 can include a registration application programing interface (API) suite 2201 and a database 225. The registration API suite 2201 can include an API integration layer 221, a client link layer 223, and a create profile layer 224.

The extranet provisioning subsystem 220 can be communicatively connected to the non-enterprise client device 190 over a communication link 18 via, for example, an ISP (not shown) or cellular carrier 180 (shown in FIG. 1). The database 225 can store a non-enterprise client directory. The database 225 can be managed and controlled by the registration API Suite 2201 to add, modify, or delete records in the non-enterprise client directory. The database 225 can store a plurality of non-enterprise client records, each one including a data field comprising a non-enterprise email address and a password. The non-enterprise client record can include a non-enterprise user profile. The non-enterprise client record can include the $ID_{INDEX}$ assigned to the non-enterprise client.

Some or all of the data in the non-enterprise client record can be created and populated by, or at the instruction of the provisioner 212 and communicated to or synched with the external client directory (e.g., Internet client directory) hosted in, for example, the database 225. The $ID_{INDEX}$ can be referenced by the provisioner 212 for the non-enterprise client account in the external client directory.

Figure 4:
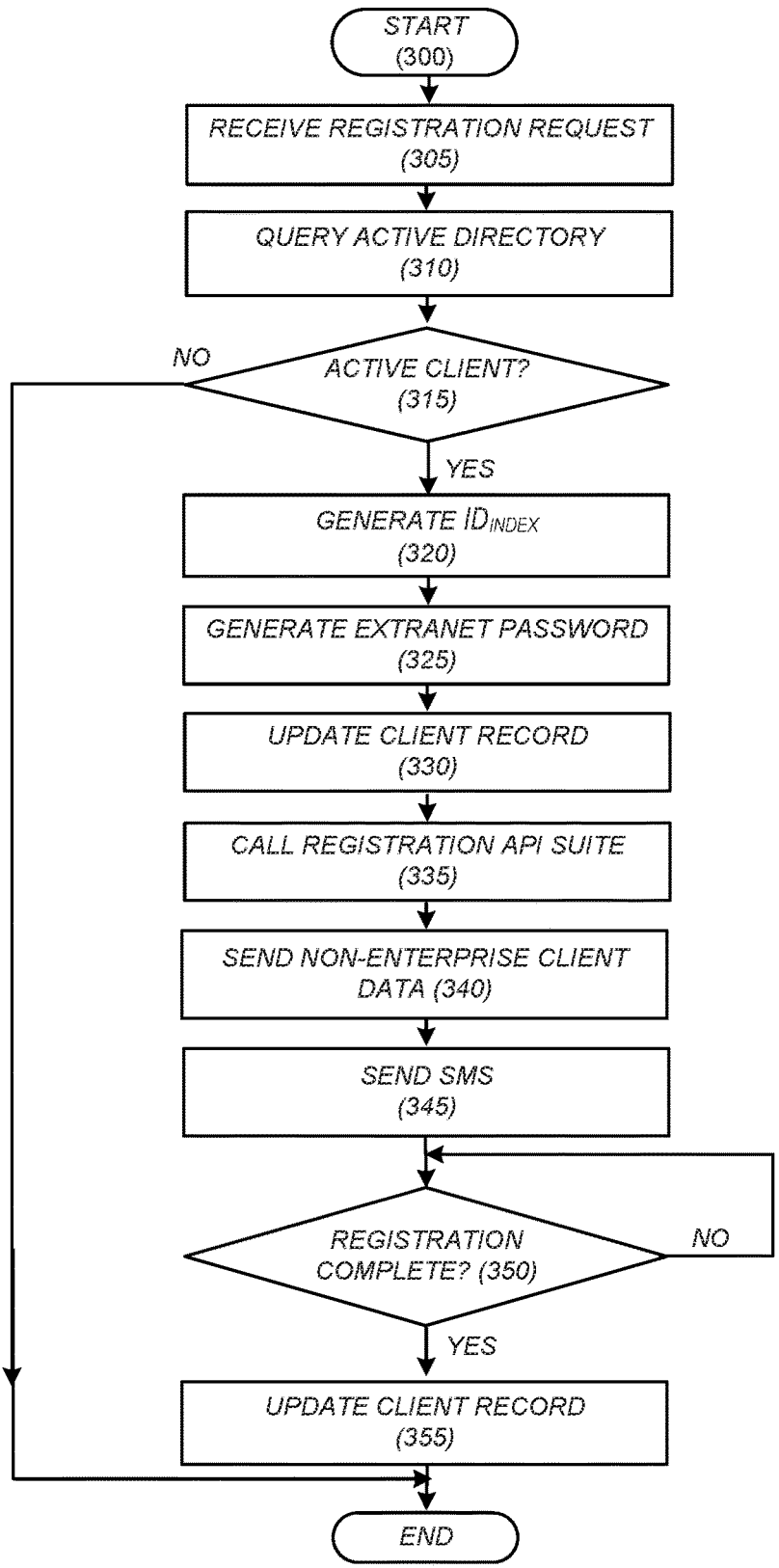
FIG. 4 shows an example of an extranet provisioning process that can be carried out by the provisioning system in FIG. 3.

FIG. 4 shows an example of an extranet provisioning process 300 according to the principles of the disclosure. Referring to FIGS. 3 and 4, an enterprise client can access an intranet application on the enterprise client device 142 and enter a unique non-enterprise email address and mobile telephone number and select a REGISTER command that instructs the enterprise client device 142 to send an extranet registration request, which can be received at the provisioner 212 (Step 305). After receiving the extranet registration request, the provisioner 212 can parse the extranet registration request to determine the non-enterprise email address and mobile telephone number entered by the enterprise client at the enterprise client device 142, the enterprise client's user identification (e.g., login identification), the MAC address of the enterprise client device, the enterprise client's enterprise email address, biometric information, or any other information that can be used to accurately identify and authenticate the enterprise client. The parsed information can be used by the intermediary provisioning layer (not shown) in the provisioner 212 to query the active directory 214 to locate an enterprise client record for the particular enterprise client (Step 310). The active directory 214 can include, for example, a Lightweight Directory Access Protocol (LDAP) directory.

If it is determined that the active directory 214 does not include an enterprise client record for the particular enterprise client (NO at Step 315), then the extranet provisioning process 300 can be terminated. Prior to terminating the process, a message can be generated and sent by the provisioner 212 to the IAM system 216 to reconcile the enterprise client's status and enterprise client record, including the enterprise client profile, in the enterprise network system 100. The reconciliation process can include modifying, creating or deleting an enterprise client record for the particular enterprise client, including any enterprise client profile, as appropriate.

If it is determined that the active directory 214 includes an enterprise client record for the particular enterprise client (YES at Step 315), then the enterprise client record can be accessed and the rights, privileges and policies in the enterprise client profile can be referenced to determine the appropriate rights, privileges and policies to apply for the non-enterprise client. For instance, only certain areas of the extranet enterprise domain might be made available to the particular enterprise client, or the non-enterprise clients associated with the particular enterprise client. The provisioner 212 can then generate an $ID_{INDEX}$ for the non-enterprise client (Step 320). The $ID_{INDEX}$ can be stored in the database 218. The $ID_{INDEX}$ can be stored in a database table as a database index and used to identify a location of an enterprise client record (or enterprise client profile) associated with the particular non-enterprise client assigned the $ID_{INDEX}$. The $ID_{INDEX}$ value can include, for example, hexadecimal values, alphanumeric characters, symbols, or the like. The enterprise client record can include the $ID_{INDEX}$, such as, for example, the database 218, or the enterprise client record and $ID_{INDEX}$ can be stored at different locations on the intranet. The provisioner 212 can also generate an initial extranet password (Step 325).

After the $ID_{INDEX}$ and initial extranet password are generated (Steps 320 and 325), a non-enterprise client record can be created (or updated, if previously created) by the provisioner 212 and populated with the $ID_{INDEX}$, non-enterprise email address, mobile telephone number, automatic number identification (ANI), and initial extranet password and stored locally on the intranet, such as, for example, in the database 218 (Step 330). Alternatively, the enterprise client record can be populated with the $ID_{INDEX}$, non-enterprise email address, mobile telephone number, automatic number identification (ANI), and initial extranet password. According to a non-limiting embodiment, the database 218 can include a relational database comprising at least three separate database regions, including, for example, an enterprise region that includes the enterprise client records, an extranet region that includes non-enterprise client records, and a database index that includes $ID_{INDEX}$ values that can be referenced to identify corresponding enterprise client records and non-enterprise client records for each $ID_{INDEX}$ value.

After the provisioning request has been processed and completed on the intranet, the provisioner 212 can perform an outbound call through the intranet firewall to the registration API suite 2201 using, for example, a Representational State Transfer (REST) API (Step 335) and transfer the non-enterprise client data, including the $ID_{INDEX}$ value, the non-enterprise email address, the mobile telephone number, ANI and the initial extranet password to the registration API suite 2201 (Step 340). The communication between the provisioner 212 and registration API suite 2201 can be carried out using a platform such as, for example, the SAP NetWeaver Process Integration (SAP PI) platform in SAP's enterprise application integration (EAI) software, to facilitate the exchange of information between the intranet provisioning system 210 and the extranet provisioning system 220. The registration API suite 2201 can include a library of whitelisted IP addresses that can be referenced to verify that the data packets received in the call actually came from the provisioner 212. This can be done, for example, by parsing the source IP address from the data packets and comparing the IP address to the IP address in the library for the intranet (for example, the IP address for the provisioner 212). The provisioner 212 can include a computing device that has a static IP address.

After sending the non-enterprise client data (Step 340), the provisioner 212 can generate and send an access message to the non-enterprise client device 190 that is associated with the mobile telephone number or ANI (Step 345). The non-enterprise client data can include the linkage message to be sent to the non-enterprise client device 190. The access message sent to the client device 190 can include an SMS text message that is sent over the PSTN network 155, or PLMN, or the Internet, or the like. The message can include the initial extranet password associated with the mobile telephone number or ANI.

Optionally, a determination can be made whether extranet provisioning of the non-enterprise client 190 has been completed (Step 350), otherwise this step can be omitted and the non-enterprise client record updated (Step 355). The determination can be based on, for example, the delivery of the access message to the non-enterprise client device 190 or the receipt of a confirmation message from the registration API suite 2201 that provisioning of the client device 190 was completed. If a determination is made that the provisioning of the non-enterprise client has been completed (YES at Step 350), then the non-enterprise client record can be updated (Step 355), otherwise the process can wait (NO at Step 350) until a determination is made that the non-enterprise client has been provisioned.

Figure 5:
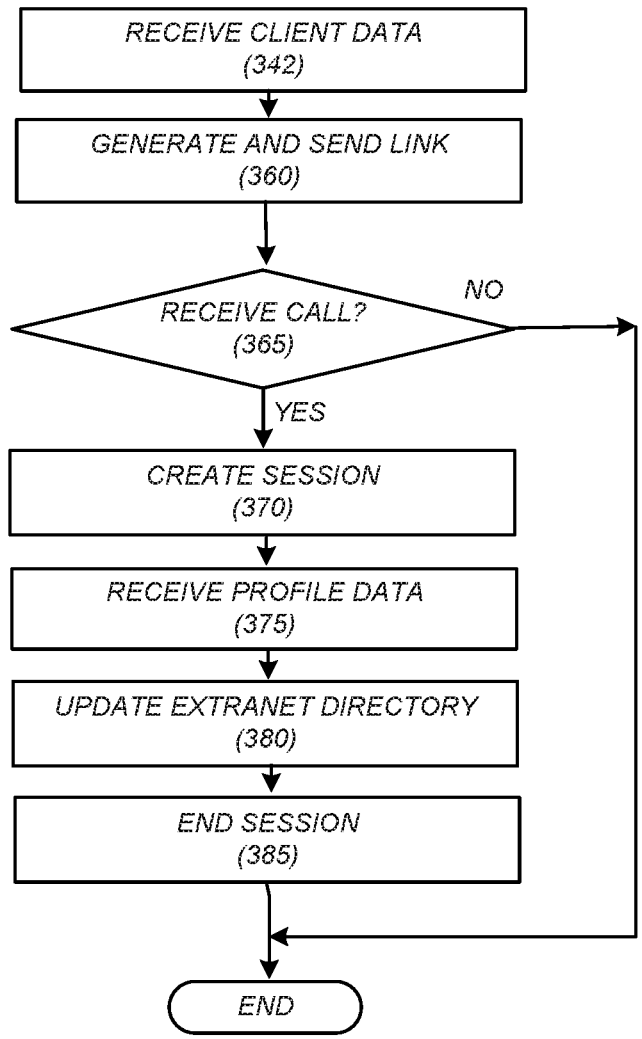
FIG. 5 shows an example of an extranet client registration process that can be carried out by the provisioning system in FIG. 3.

FIG. 5 shows an example of an extranet client registration process, according to the principles of the disclosure. Referring to FIGS. 3-5, after the non-enterprise client data is sent to the registration API suite 2201 from the provisioner 212 (Step 340 in FIG. 4), the registration API suite 2201 receives the non-enterprise client data (Step 342) and automatically generates and sends a linkage message (e.g., in an email) to the non-enterprise client device 190 that includes a unique activation link (Step 360). The activation link can be set to expire after a set time (for example, 48 hours). If the linkage message is opened and the activation link activated, then a call signal can be generated and sent from the non-enterprise client device 190 and received at the registration API suite 2201 (YES at Step 365), otherwise the registration API suite 2201 can wait until the set time has expired, at which the process can be terminated (NO at Step 365).

When the call signal is received from the non-enterprise client device 190, the registration API suite 2201 can open or create a communication session with the non-enterprise client device 190 such as, for example, by means of a web browser, and provide a GUI with data entry fields for the non-enterprise client to input a username, the initial extranet password previously provided in the access message in Step 345 (Step 370). After the non-enterprise client enters the requested data in the entry fields of the GUI, the entered data can be received at the registration API 2201 (Step 375), where it is parsed and used to populate or update the extranet non-enterprise client directory (Step 380). The session can then be terminated (Step 385). At this point, a provisioning complete confirmation signal can be sent to the provisioner 212.

Figure 6:
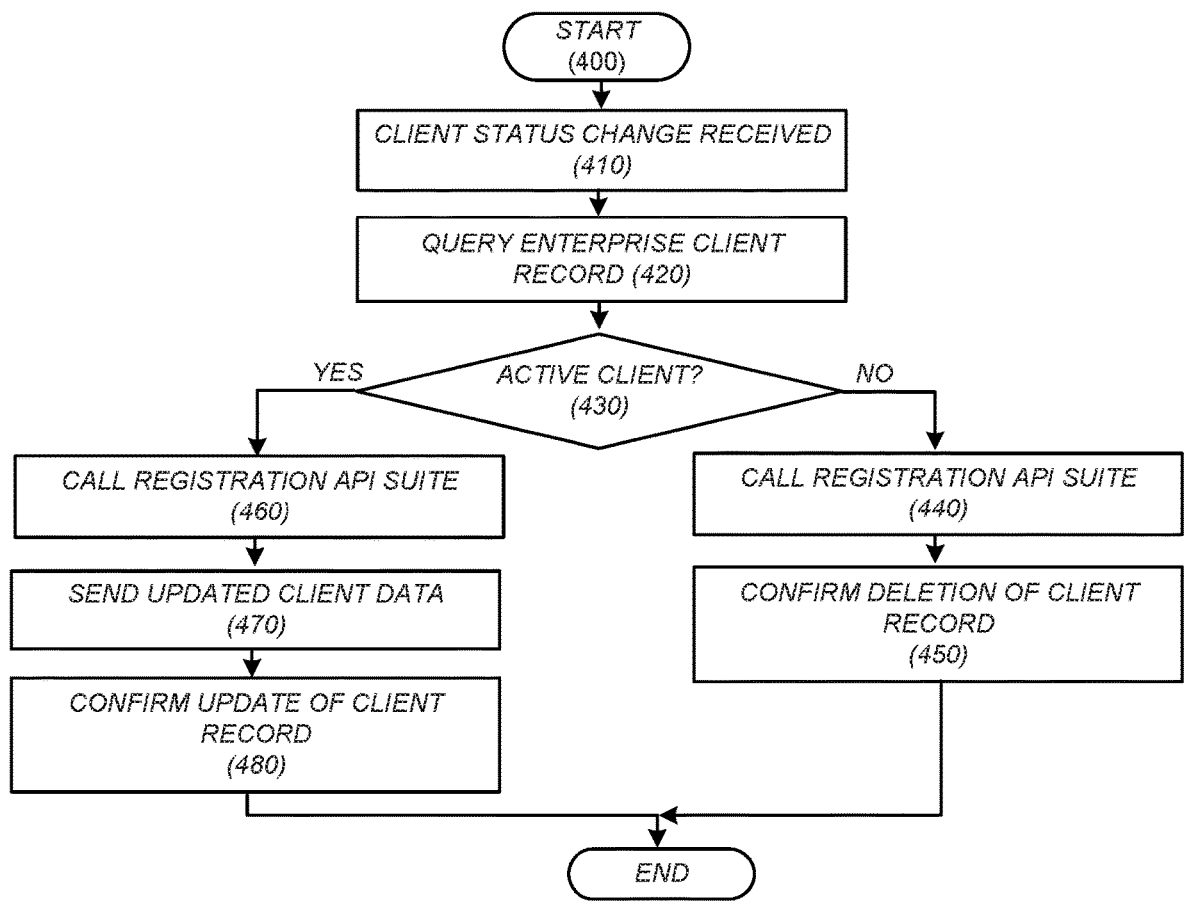
FIG. 6 shows an example of a registration updating process that can be carried out by the provisioning system in FIG. 3.

FIG. 6 shows an example of a registration updating process 400, according to the principles of the disclosure. Referring to FIGS. 3 and 6, where a change is made to an enterprise client record, such as, for example, where an enterprise client (e.g., an employee) is terminated, has a job reassignment, or any right, privilege, or policy is changed in any way for the particular enterprise client, an enterprise client status change request can be received by the provisioner 212 (Step 410). A query can be generated and sent to identify and retrieve the enterprise client record that is associated with the particular enterprise client (Step 420). A determination can be made whether the enterprise client is an active enterprise client by, for example, querying the active directory 214 (Step 430).

If it is determined that the enterprise client is no longer an active enterprise client (e.g., the enterprise client is a former employee who resigned, was terminated, or otherwise is no longer an employee) (NO at Step 430), then the provisioner 212 can perform an outbound call through the intranet firewall to the registration API suite 2201 using, for example, a REST API (Step 440) and send one or more $ID_{INDEX}$ values associated with the particular, former enterprise client, which the registration API suite 2201 can use to identify the corresponding extranet non-enterprise client record(s) and delete the record(s), thereby terminating access to the extranet enterprise domain by the non-enterprise clients associated with the received $ID_{INDEX}$ values. The registration API suite 2201 can confirm deletion of the record(s) (Step 450).

If it is determined that the enterprise client is an active enterprise client, but a change has been made to the enterprise client record, such as, for example, a change in the enterprise client's job, access rights, privileges, policies, or the like, or the enterprise client has initiated a change to the extranet enterprise domain access rights of one or more non-enterprise clients (YES at Step 430), then the provisioner 212 can perform an outbound call through the intranet firewall to the registration API suite 2201 (Step 460) and send an $ID_{INDEX}$ value for each non-enterprise client associated with the enterprise client, as well as an email address and mobile telephone number (or ANI) data for each non-enterprise client (Step 470), so that the associated non-enterprise client record(s) can be updated. The registration API suite 2201 can confirm updating of the non-enterprise client record(s) (Step 480).

Figure 7:
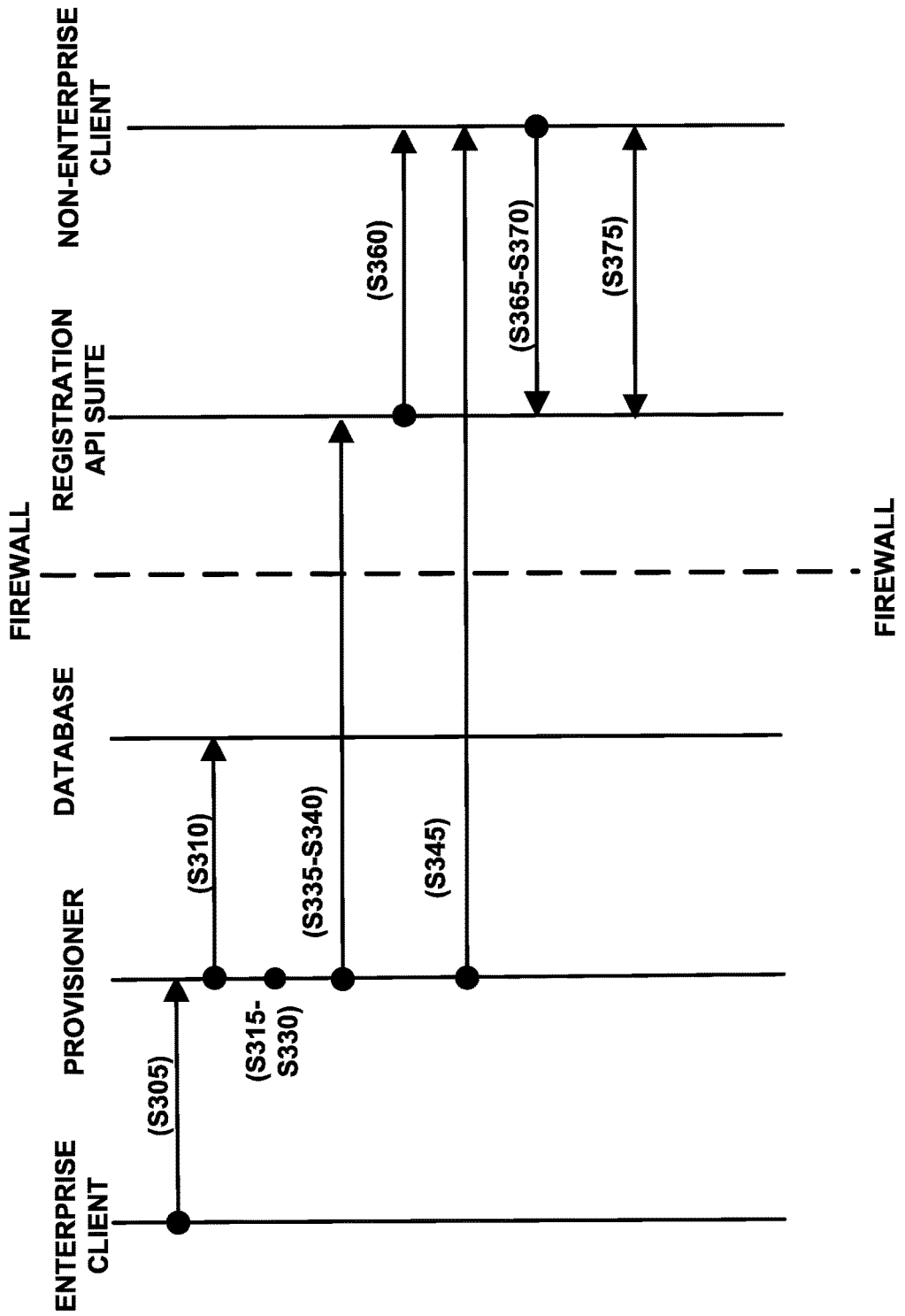
FIG. 7 shows an example of a connectivity flow for provisioning a non-enterprise client device by the provisioning system in FIG. 3.

FIG. 7 shows an example of a connectivity flow for provisioning a non-enterprise client device, according to an embodiment of the disclosure, including Steps 305 through 375 discussed above.

FIG. 8 shows an example a display screen that can be generated and displayed as a GUI on the display of the enterprise client device 142 (shown in FIG. 1) through which an enterprise client can request that the non-enterprise client device 190 be provisioned with access to the extranet enterprise domain. The GUI can include enterprise client entry fields, including a non-enterprise email address, a mobile phone number (or ANI) and a registration command, which can be displayed as, for example, a radio button. An $ID_{INDEX}$ value (e.g., "75bf3332-8595-4c0e-b8bd-0fcd4278ff6b") may be assigned to each non-enterprise client associated with the particular enterprise client. The GUI can include non-enterprise client entry fields for all non-enterprise clients associated with that enterprise client. The GUI can be populated with all non-enterprise client names retrieved from the enterprise client record or non-enterprise client accounts associated with that enterprise client record, and entry fields for each non-enterprise client account, including a non-enterprise email address, a mobile phone number (or ANI), and one or more command fields (e.g., "INVITE," "RESEND ACTIVATION," "EDIT," "DELETE," "RESET LOGIN DETAILS," or the like).

In the example shown in FIG. 8, three non-enterprise client accounts are associated with a particular enterprise user record, including "John Doe," "Jane Doe," and "John Smith." In this non-limiting example, the non-enterprise client names can be retrieved automatically from beneficiary data (e.g., from a corporate life insurance policy), dependent data (e.g., from tax data), family member data (e.g., from corporate records), or any other data previously provided from by the enterprise client and identified as beneficiaries, dependents, family members, or the like. Alternatively, the non-enterprise client names can be entered by the enterprise client via the enterprise client device 142 (shown in FIG. 1).

The non-enterprise client John Doe can be a family member (e.g., a child of the enterprise user) for whom the enterprise client has not requested provisioning access to the extranet enterprise domain. The enterprise client record can include a field that indicates that an extranet registration request was never received from the enterprise client for John Doe. In this instance, an "INVITE" command field (e.g., radio button) can be displayed. If the enterprise client selects the "INVITE" command on the enterprise client device 142, the device will generate and transmit a registration request to the provisioner 212 (shown in FIG. 3), including identifying information for that enterprise client device 142, a timestamp, identifying information for the enterprise client (e.g., user identification), identifying information for that non-enterprise client (e.g., "John Doe"), and any other information that can be used to verify and authenticate that enterprise client or enterprise client device 142.

The non-enterprise client Jane Doe can be a family member (e.g., an adult child of the enterprise user) for whom the enterprise client previously requested provisioning access to the extranet enterprise domain, but the non-enterprise client never completed the extranet registration process discussed above (shown in FIG. 5). The enterprise client record can include a field that indicates that a registration request was received from the enterprise client for Jane Doe and processed by the provisioner 212. The record field can indicate whether a linkage message and/or an access message was sent to a non-enterprise client device associated with Jane Doe. In this instance, a plurality of command fields can be displayed (e.g., as radio buttons), including "RESEND ACTIVATION," "EDIT," and "DELETE" commands. If the enterprise client selects the "RESEND ACTIVATION" command on the enterprise client device 142, the device will generate and transmit a registration request resend instruction to the provisioner 212 (shown in FIG. 3), including identifying information for that enterprise client device 142, a timestamp, identifying information for the enterprise client (e.g., user identification), identifying information for that non-enterprise client (e.g., "Jane Doe"), and any other information that can be used to verify and authenticate that enterprise client or enterprise client device 142.

If the enterprise client selects the "EDIT" command on the enterprise client device 142, the device will generate and transmit an edit request instruction to the provisioner 212 (shown in FIG. 3), including any edited data in the email address and phone number (or ANI) fields, as well as identifying information for that enterprise client device 142, a timestamp, identifying information for the enterprise client (e.g., user identification), identifying information for that non-enterprise client (e.g., "Jane Doe"), and any other information that can be used to verify and authenticate that enterprise client or enterprise client device 142.

If the enterprise client selects the "DELETE" command on the enterprise client device 142, the device will generate and transmit a delete request instruction to the provisioner 212 (shown in FIG. 3), including identifying information for that enterprise client device 142, a timestamp, identifying information for the enterprise client, identifying information for the non-enterprise client (e.g., "Jane Doe"), and any other information that can be used to verify and authenticate that enterprise client or enterprise client device 142. After receiving the delete request instruction from the enterprise client device 142, the provisioner 212 can send a follow-up instruction to an appropriate subsystem (not shown) in the intranet to follow up with the enterprise client, in case any changes need to be made to enterprise records associated with that enterprise client (e.g., beneficiary data, dependent data, family member data, or the like).

The non-enterprise client John Smith can be a family member (e.g., a spouse of the enterprise user) for whom access to the extranet enterprise domain was previously provisioned. The enterprise client record can include a field that indicates that the non-enterprise client John Smith is active. In this instance, a plurality of command fields can be displayed (e.g., as radio buttons), including "RESEND LOGIN DETAILS," "EDIT," and "DELETE" commands. If the enterprise client selects the "EDIT" or "DELETE" command, the enterprise client device 142 will generate and transmit an edit request or a delete request to the provisioner 212, as discussed above. If the enterprise client selects the "RESEND LOGIN DETAILS" command on the enterprise client device 142, the device will generate and transmit a resend login details request to the provisioner 212 (shown in FIG. 3), including identifying information for that enterprise client device 142, a timestamp, identifying information for the enterprise client, identifying information for that non-enterprise client (e.g., "John Smith"), and any other information that can be used to verify and authenticate that enterprise client or enterprise client device 142. This command can be useful where the non-enterprise client John Smith changed his email address or phone number (or ANI). Upon receiving the resend login details request from the enterprise client device 142, the provisioner 212 can initiate the process discussed above (e.g., shown in FIG. 4).

A computer readable medium can be provided containing a computer program, which when executed on one or more of the computing devices in the intranet provisioning system 210 or extranet provision system 220, cause the processes shown in FIGS. 4-6, the connectivity flow shown in FIG. 7, and display screen in FIG. 8 to be carried out. The computer program can be tangibly embodied in the computer readable medium, comprising one or more program instructions, code segments, or code sections for performing each of the Steps 305 through 355 in FIG. 3 (and FIG. 7), Steps 342 through 385 in FIG. 5 (and FIG. 7), Steps 410 through 480 in FIG. 6, and displaying the GUI in FIG. 8, when executed by the one or more computing devices in the intranet provisioning system 210 or extranet provisioning system 220.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation. The communicating device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, WiFi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, Bluetooth, or the like.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A provisioning system that provisions a non-enterprise client device with access to an extranet enterprise domain, the provisioning system comprising:
   an enterprise client device connected to an intranet;
   a provisioner that receives an extranet registration request from the enterprise client device and parses enterprise client data and non-enterprise client data from the extranet registration request;

an active directory connected to the intranet and having an enterprise client record associated with the enterprise client data;

a database that stores a non-enterprise client record populated with the non-enterprise client data;

a primary transmission system connected to the intranet that transmits a portion of the non-enterprise client data and a linkage message outside of the intranet; and a secondary transmission system connected to the intranet and configured to transmit to an access message outside of the intranet, wherein the provisioner generates, inside the intranet, a unique permanent identification $ID_{INDEX}$ that maps the non-enterprise client device to the enterprise client device to register the non-enterprise client device in the intranet, wherein the provisioner creates an initial password for the non-enterprise client account associated with the unique permanent identification $ID_{INDEX}$, wherein the access message is sent in an SMS text message to the non-enterprise client device and includes the initial password, and wherein the portion of the non-enterprise client data transmitted by the primary transmission system and the access message transmitted by the secondary transmission system are utilized to activate the non-enterprise client account in the extranet enterprise domain.

2. The provisioning system of claim 1, wherein the provisioner generates the linkage message and the access message.

3. The provisioning system of claim 1, wherein the linkage message is sent to a non-enterprise client device in an email message.

4. The provisioning system of claim 1, wherein the active directory comprises a lightweight directory access protocol (LDAP) directory.

5. The provisioning system of claim 1, wherein the provisioner queries the active directory in response to the extranet registration request to locate the enterprise client record.

6. The provisioning system of claim 1, further comprising:

a registration application programming interface that receives the linkage message from the provisioner and generates an email message, including an activation link.

7. The provisioning system of claim 6, wherein the provisioner performs an outbound call through the intranet firewall to the registration application programming interface.

8. The provisioning system of claim 6, wherein the outbound call comprises a representational state transfer (REST) application programming interface call.

9. The provisioning system of claim 6, wherein the registration application programming interface receives the non-enterprise client identifier $ID_{INDEX}$ for the non-enterprise client.

10. The provisioning system of claim 6, wherein the registration application programming interface receives the portion of the non-enterprise client data.

11. The provisioning system of claim 1, wherein the portion of the non-enterprise client data comprises a non-enterprise email address and an automatic number identification for a non-enterprise client device.

12. A method for provisioning a non-enterprise client device with access to an extranet enterprise domain, the method comprising:

receiving an extranet registration request from an enterprise client device connected to an intranet;

parsing enterprise client data and non-enterprise client data from the extranet registration request;

querying an active directory for an enterprise client record based on the enterprise client data, the active directory being connected to the intranet;

storing the non-enterprise client data in a non-enterprise client record;

generating, inside the intranet, a unique permanent identification $ID_{INDEX}$ that maps the non-enterprise client device to the enterprise client device to register the non-enterprise client device in the intranet;

creating an initial password for a non-enterprise client account associated with the unique permanent identification $ID_{INDEX}$;

sending the access message, which includes the initial password, in an SMS text message to the non-enterprise client device;

transmitting by a primary transmission system a portion of the non-enterprise client data outside of the intranet; and transmitting by a secondary transmission system the access message outside of the intranet, the secondary transmission system being different than the primary transmission system, wherein the portion of the non-enterprise client data transmitted by the primary transmission system and the access message transmitted by the secondary transmission system are utilized to activate the non-enterprise client account in the extranet enterprise domain.

13. The method of claim 12, further comprising:

generating a linkage message based on the non-enterprise client data; and transmitting the linkage message outside of the intranet.

14. The method of claim 13, wherein the transmitting the linkage message comprises sending an electronic mail message to a non-enterprise client device.

15. The method of claim 13, further comprising:

receiving the linkage message at a registration application programming interface.

16. The method of claim 15, further comprising:

generating an electronic mail message by the registration application programming interface; and sending the electronic mail message to the non-enterprise client device, wherein the electronic mail message includes an activation link.

17. The method of claim 12, wherein the active directory comprises a lightweight directory access protocol (LDAP) directory.

18. The method of claim 12, further comprising:

receiving the portion of the non-enterprise client data at a registration application programming interface.

* * * * *